(12) United States Patent
Baccouche et al.

(10) Patent No.: US 11,535,182 B2
(45) Date of Patent: Dec. 27, 2022

(54) VEHICLE BUMPER ASSEMBLY

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Jamel E. Belwafa, Ann Arbor, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 17/083,630

(22) Filed: Oct. 29, 2020

(65) Prior Publication Data
US 2022/0134981 A1     May 5, 2022

(51) Int. Cl.
*B60R 19/20*     (2006.01)
*B60R 19/48*     (2006.01)
*B60R 19/18*     (2006.01)

(52) U.S. Cl.
CPC ........... *B60R 19/205* (2013.01); *B60R 19/48* (2013.01); *B60R 2019/1806* (2013.01)

(58) Field of Classification Search
CPC ...... B60R 19/205; B60R 19/483; B60R 21/36
USPC ..................... 293/107, 4; 180/274
See application file for complete search history.

(56) References Cited

U.S. PATENT DOCUMENTS

| 3,588,158 | A | * | 6/1971 | Ford | B60R 19/20 |
| | | | | | 267/116 |
| 4,170,858 | A | * | 12/1979 | Kornhauser | B60R 19/20 |
| | | | | | 280/730 |
| 6,883,631 | B2 | | 4/2005 | Hu et al. | |
| 9,027,090 | B2 | * | 5/2015 | Park | B60R 21/233 |
| | | | | | 180/274 |
| 9,027,696 | B2 | | 5/2015 | Park | |
| 10,336,290 | B1 | * | 7/2019 | Lazaro | B60R 21/36 |
| 2003/0047370 | A1 | * | 3/2003 | Gibbs | B61F 19/04 |
| | | | | | 180/271 |
| 2003/0155750 | A1 | * | 8/2003 | Hu | B60R 21/013 |
| | | | | | 280/730.1 |
| 2004/0074690 | A1 | * | 4/2004 | Sato | B60R 21/2338 |
| | | | | | 180/274 |
| 2005/0087998 | A1 | * | 4/2005 | Curry | B01F 19/04 |
| | | | | | 293/107 |

(Continued)

FOREIGN PATENT DOCUMENTS

DE     102006057655 A1 *  6/2008  ............ B60R 21/36

*Primary Examiner* — Jason S Morrow
*Assistant Examiner* — Wenwei Zhuo
(74) *Attorney, Agent, or Firm* — Frank A. MacKenzie; Bejin Bieneman PLC

(57) ABSTRACT

A vehicle includes a pair of frame rails and a bumper assembly. The bumper assembly includes a bumper beam supported by the frame rails and an airbag. The airbag includes a first airbag chamber supported by the bumper beam and inflatable to an inflated position, and a second airbag chamber supported by the bumper and inflatable to an inflated position. The first airbag chamber is disposed in a cross-vehicle direction relative to the second airbag chamber. The first airbag chamber has a first volume in the inflated position. The second airbag chamber has a second volume in the inflated position. The first volume is different than the second volume.

17 Claims, 8 Drawing Sheets

(56) References Cited

U.S. PATENT DOCUMENTS

| | | | |
|---|---|---|---|
| 2005/0230940 A1* | 10/2005 | Alexander | B60R 21/36 |
| | | | 280/730.1 |
| 2005/0209805 A1* | 12/2005 | Kalliske | B60R 21/36 |
| | | | 180/274 |
| 2005/0269805 A1 | 12/2005 | Kalliske et al. | |
| 2000/0109517 * | 8/2006 | Mishra | B60R 21/013 |
| | | | 180/274 |
| 2010/0059972 A1* | 3/2010 | Kim | B60R 21/36 |
| | | | 280/728.2 |
| 2012/0207183 A1* | 10/2012 | Wilmot | B60R 21/36 |
| | | | 180/271 |
| 2018/0244222 A1* | 8/2018 | Nusier | B60R 19/34 |
| 2019/0001919 A1* | 1/2019 | Farooq | B60R 21/36 |
| 2019/0120887 A1* | 5/2019 | Williams | B60R 21/30 |
| 2019/0375368 A1* | 12/2019 | Kanno | B60R 21/233 |
| 2021/0229022 A1* | 7/2021 | Baccouche | B60R 19/42 |

* cited by examiner

VEHICLE BUMPER ASSEMBLY

BACKGROUND

Vehicles are subject to impact testing for different types of collisions. Offset vehicle impacts may urge the occupant forward and may urge the shoulders of the occupant to rotate. In one example, a test procedure simulates an impact of a test vehicle from another vehicle offset from the test vehicle. The test procedure provides that a moving deformable barrier impacts the test vehicle with a speed of 50 kilometers per hour (kph) with a 50% overlap from a center of a front of the test vehicle. This test has been proposed for inclusion in the European New Car Assessment Program (EURO NCAP). Other examples of angular impact test include a small offset rigid barrier (SORB) test.

DETAILED DESCRIPTION

Figure 1:
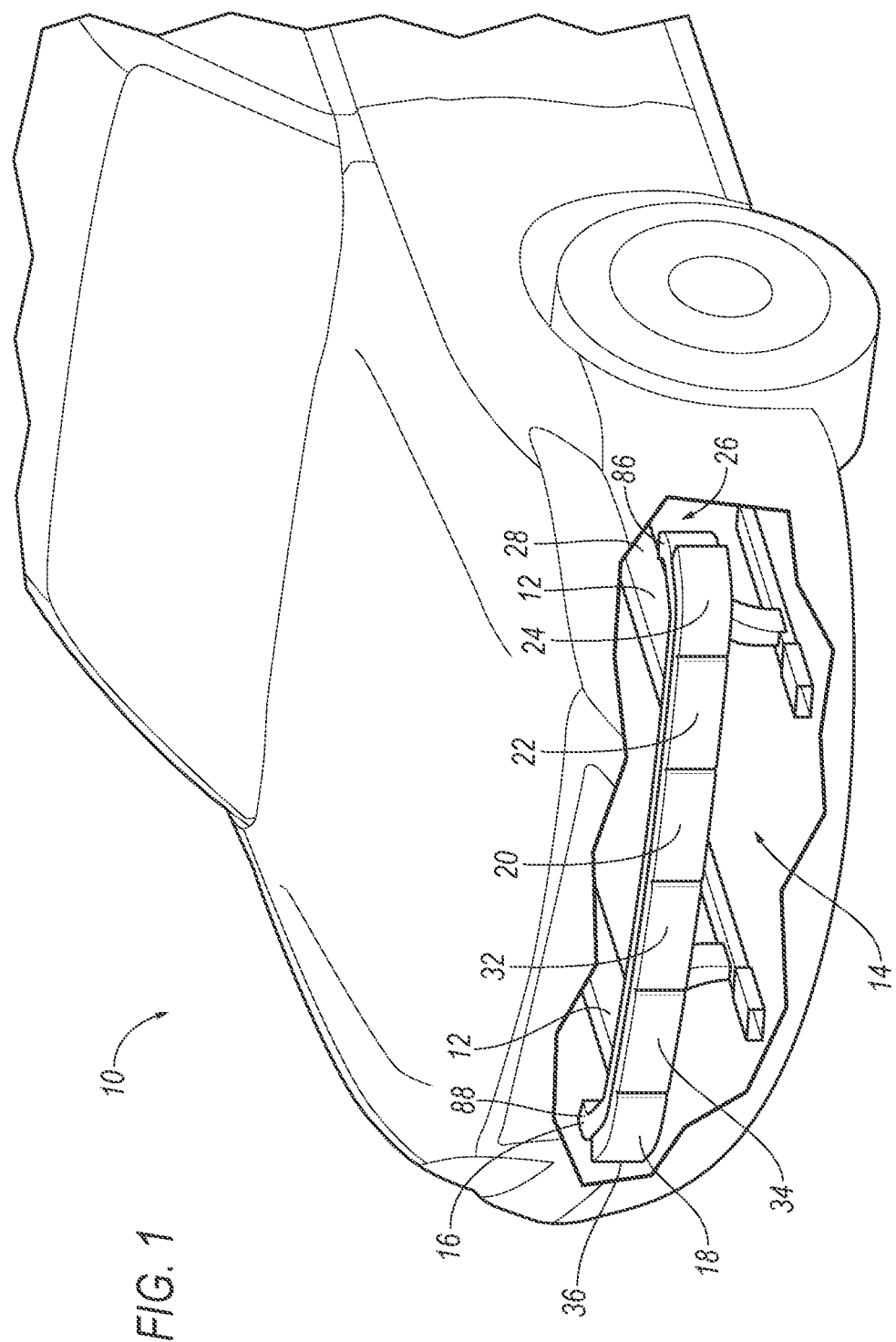
FIG. 1 is a perspective view of a vehicle with an airbag supported by a bumper beam.

A vehicle includes a pair of frame rails, a bumper beam supported by the frame rails, a first airbag chamber supported by the bumper beam and inflatable to an inflated position, and a second airbag chamber supported by the bumper beam and inflatable to an inflated position. The first airbag chamber is disposed in a cross-vehicle direction relative to the second airbag chamber. The first airbag chamber has a first volume in the inflated position. The second airbag chamber has a second volume in the inflated position. The first volume is different than the second volume.

The vehicle may further include a third airbag chamber supported by the bumper beam and inflatable to an inflated position. The third airbag chamber may be disposed in a cross-vehicle direction relative to the first airbag chamber and the second airbag chamber. The third airbag chamber may have a third volume in the inflated position. The third volume may be different than the first volume.

The third volume may be different than the second volume.

The second airbag chamber may be outboard of the first airbag chamber and the third airbag chamber may be outboard of the second airbag chamber. The second volume may be less than the first volume and the third volume.

The third airbag chamber may be outboard of one of the frame rails. The third volume may be greater than the first volume.

The second airbag chamber may be aligned with one of the frame rails in the cross-vehicle direction.

The third airbag chamber may include a tether. The vehicle may further include a computer having a processor and memory storing instructions executable by the processor to release the tether in response to detection of impact with a small offset rigid barrier.

The second airbag chamber may be aligned with one of the frame rails in the cross-vehicle direction.

The vehicle may further include a computer having a processor and memory storing instructions executable by the processor to inflate the third airbag chamber in response to detection of impact with a small offset rigid barrier.

The vehicle may further include a computer having a processor and memory storing instructions executable by the processor to selectively inflate the first airbag chamber, the second airbag chamber, or both the first and second airbag chamber based on a type of vehicle impact detected.

At least one of the first airbag chamber or the second airbag chamber includes a tether. The vehicle may further include a computer having a processor and memory storing instructions executable by the processor to selectively release the tether based on a type of vehicle impact.

The first airbag chamber and the second airbag chamber may be in fluid communication with each other. The vehicle may further include an inflator that inflates both the first airbag chamber and the second airbag chamber.

The first airbag chamber and the second airbag chamber may be fluidly isolated. The vehicle may further include a first inflator in communication with the first airbag chamber and a second inflator in communication with the second airbag chamber The first airbag chamber in the inflated position may have a different inflation pressure than the second airbag chamber in the inflated position.

The first airbag chamber may be disposed between a midpoint of the bumper beam and the second airbag chamber.

A bumper assembly includes a bumper beam, a first airbag chamber supported by the bumper beam and inflatable to an inflated position, and a second airbag chamber supported by the bumper beam and inflatable to an inflated position. The first airbag chamber is disposed in a cross-vehicle direction relative to the second airbag chamber. The first airbag chamber has a first volume in the inflated position and the second airbag chamber has a second volume in the inflated position. The first volume is different than the second volume.

The bumper assembly may further include a third airbag chamber supported by the bumper beam and inflatable to an inflated position. The third airbag chamber may be disposed in a cross-vehicle direction relative to the first airbag chamber and the second airbag chamber. The third airbag chamber may have a third volume in the inflated position. The third volume may be different than the first volume.

The third volume may be different than the second volume.

The second airbag chamber may be outboard of the first airbag chamber and the third airbag chamber may be outboard of the second airbag chamber. The second volume may be less than the first volume and the third volume.

The third volume may be greater than the first volume.

With reference to the Figures, wherein like numerals indicate like parts throughout the several views, a vehicle 10, 10' includes a pair of frame rails 12 and a bumper assembly 14, 14'. The bumper assembly 14, 14' includes a bumper beam 16 supported by the frame rails 12 and an airbag 18, 18'. The airbag 18, 18' includes a first airbag chamber 20, 20' supported by the bumper beam 16 and inflatable to an inflated position, and a second airbag chamber 22, 22' supported by the bumper and inflatable to an inflated position. The first airbag chamber 20, 20' is disposed in a cross-vehicle direction A relative to the second airbag chamber 22, 22'. The first airbag chamber 20, 20' has a first volume in the inflated position. The second airbag chamber 22, 22' has a second volume in the inflated position. The first volume is different than the second volume.

Since the first airbag chamber 20, 20' and the second airbag chamber 22, 22' are positioned in the cross-vehicle direction A relative to each other and have different volumes in the inflated position, the first airbag chamber 20, 20' and the second airbag chamber 22, 22' provide varying energy absorption characteristics along the bumper beam 16 in the cross-vehicle direction A. For example, the first airbag chamber 20, 20' and the second airbag chamber 22, 22' may be inflated to suitable respective volumes to absorb energy from a barrier in an impact test. As an example, the volumes of the first airbag chamber 20, 20' and the second airbag chamber 22, 22' may be such that impact forces during a vehicle impact are distribute along the cross-vehicle direction A. Specifically, the volumes of the first airbag chamber 20, 20' and the second airbag chamber 22, 22' may be sized to match variation in stiffness of a front end 84 of the vehicle 10, 10' in the cross-vehicle direction A to provide homogeneity of load distribution across the front end 84 of the vehicle 10, 10'.

The airbag 18, 18' may include any suitable number of airbag chambers, i.e., two or more, positioned in the cross-vehicle direction A. In the example shown in the Figures, the airbag includes six airbag chambers that span the entire length of the bumper beam 16 in the cross-vehicle direction A. The volume of any one of the airbag chambers may be different than the volume of any other of the airbag chambers to distribute loads and absorb energy during vehicle impact. As described further below, the volume of any one or more of the airbag chambers may be selectively adjusted to vary the volume of the airbag chamber, e.g., based on the type and/or direction of vehicle impact.

The vehicle 10, 10' may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, 10', for example, may be an autonomous vehicle. In other words, the vehicle 10, 10' may be autonomously operated such that the vehicle 10, 10' may be driven without constant attention from a driver, i.e., the vehicle 10, 10' may be self-driving without human input. The cross-vehicle direction A is perpendicular to forward motion of the vehicle 10, 10'.

Figure 2:
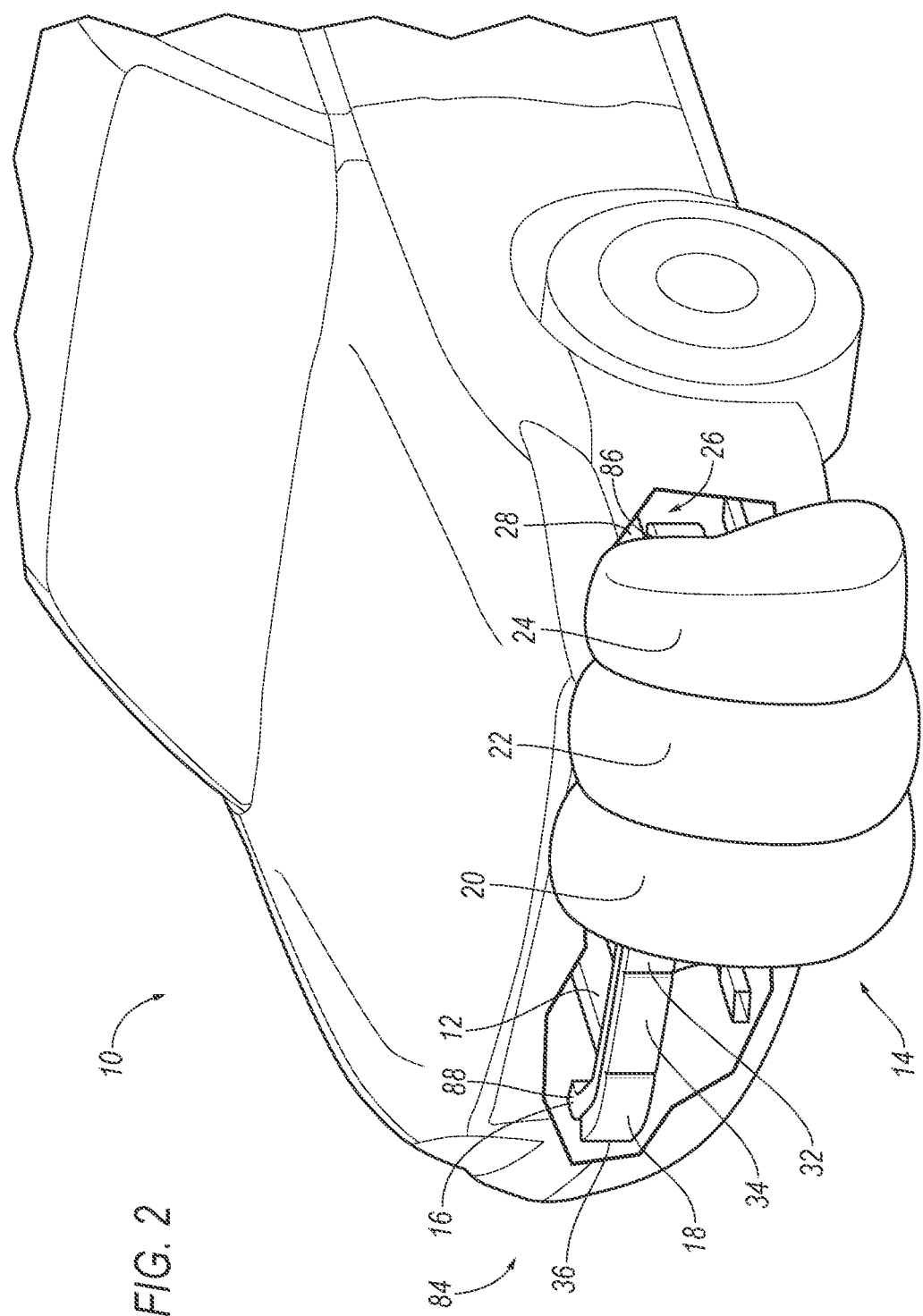
FIG. 2 is a perspective view of the vehicle with the airbag in an inflated position.

The vehicle 10, 10' includes a vehicle body 26, as shown in FIGS. 1-2. The vehicle body 26 includes body panels partially defining an exterior of the vehicle 10. The body panels may present a class-A surface, e.g., a finished surface exposed to view by a customer and free of unaesthetic blemishes and defects.

The vehicle 10, 10' includes a vehicle frame 28, as shown in FIGS. 1-5. The vehicle frame 28 includes the frame rails 12. In the example shown in the Figures, the vehicle frame 28 may be of a unibody construction in which the frame is unitary with a vehicle body 26 (including frame rails 12, pillars, roof rails, etc.). As another example, the body and frame may have a body-on-frame construction (also referred to as a cab-on-frame construction) in which the vehicle body 26 and vehicle frame 28 are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc.

The frame 28 includes the pair of frame rails 12, as shown in FIGS. 1-5. The frame rails 12 are elongated in a vehicle-longitudinal direction. The frame rails 12 may support body panels, a sub-frame, steering and suspension components, etc. The frame rails 12 support the bumper beam 16. For example, the bumper beam 16 may be fixed to the frame rails 12.

The frame rails 12 and the bumper beam 16 absorb energy during vehicle impact. Specifically, during vehicle impact in which the bumper beam 16 is impacted, the bumper beam 16 may transfer energy to the frame rails 12. Because the frame rails 12 extend in the vehicle-longitudinal direction, the frame rails 12 reinforce the bumper beam 16 and resist bending of the bumper beam 16 at the frame rails 12. Specifically, moments in portions of the bumper beam 16 closer to the frame rails 12 may be less than moments in portions of the bumper beam 16 farther from the frame rails 12, and thus the portions of the bumper beam 16 closer to the frame rails 12 may resist deformation more than portions of the bumper beam 16 away from the frame rails 12.

The front end 84 of the vehicle 10, 10' typically includes components and structural portions of the vehicle 10, 10' in a vehicle-forward direction B (i.e., a vehicle-longitudinal direction B) relative to a passenger cabin. For example, the front end includes the frame rails 12, the bumper beam 16, an engine compartment and all components in the engine compartment including an engine and associated components, front suspension and steering components, and wheels. The stiffness of the front end 84 in the vehicle-longitudinal direction B varies in the cross-vehicle direction A. An area of the front end 84 having relatively high stiffness deforms in the vehicle-longitudinal direction B during vehicle impact at the front end 84 less than an area of the front end 84 having relatively low stiffness. Specifically, an area of high stiffness resists deformation more than an area of low stiffness.

The variation in stiffness is due to different components and structural portions in the front end 84 of the vehicle 10, 10' that absorb energy differently. Specifically, the different components and structural portions of the front end 84 of the vehicle 10, 10' may have different properties that result in differences in stiffness. For example, the frame rails 12 resist deformation and result in relatively high stiffness. In addition or in the alternative, stack-up of components and structural portions of the front end may result in different stiffness. Specifically, areas of the front end that include stiff components packaged tightly relative to each other will be stiffer than areas of the front end that include components that are relatively less stiff and packaged loosely relative to each other. For example, the properties and stack-up of an area of the front end 84 aligned in the cross-vehicle direction A with the engine may be stiffer than an area of the front end 84 aligned in the cross-vehicle direction A with the wheel of the vehicle 10, 10'. This is due to the relatively stiff properties of the engine and nearby components and tight packaging around the engine compared to less stiff properties and loose packaging of the wheel, steering components, and suspension components.

As described further below, in FIG. 2, an example stiffness of the front end 84 of the vehicle 10, 10' between the frame rails 12 is represented as shaded rectangles, where smaller sizes of the shaded rectangles represent less stiffness of the front end of the vehicle 10. During a vehicle impact at the front end 84 of the vehicle 10, 10', the front end 84 of the vehicle 10, 10' absorbs energy of the impact. Areas of the front end 84 that are less stiff absorb less energy from the impact. As described further below, the respective volumes of different airbag chambers 20, 20', 22, 22', 24, 24', 32, 32', 34, 34', 36, 36' are varied accommodate to the variation in the stiffness of the front end 84 to more evenly distribute the load and energy absorption of the impact.

The bumper beam 16 has a midpoint 30, i.e., a point substantially equally distant between a first lateral end 86 of the bumper beam 16 and a second lateral end 88 of the bumper beam 16. The midpoint 30 may be equidistant to each frame rail 12 in the cross-vehicle direction A. The midpoint 30 may be aligned with relatively rigid structure at the front end 84 of the vehicle 10, 10' in the vehicle-longitudinal direction B, e.g., a vehicle engine. Specifically, the structure of the vehicle 10, 10' aligned with the midpoint 30 of the bumper beam 16 may be rigid relative to structure at the front end 84 of the vehicle 10, 10' that is in the vehicle-longitudinal direction B of the lateral ends of the bumper beam, e.g., suspension components, a vehicle wheel, etc.

The vehicle 10, 10' includes the airbag 18, 18' as shown in FIGS. 1-5. The airbag 18, 18' may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The airbag 18, 18' is supported by the bumper beam 16.

The airbag 18, 18' may be designed to address variations in stiffness of the front end 84 of the vehicle 10, 10'. In FIG. 2, as described above, the stiffness of the front end 84 of the vehicle 10, 10' between the frame rails 12 is represented as shaded rectangles, where smaller sizes of the shaded rectangles represent less stiffness of the front end of the vehicle 10. The smaller shaded rectangles toward the midpoint 30 of the bumper beam 16 indicate that the stiffness of the front end 84 typically decreases in the cross-vehicle direction A away from the frame rails 12. The respective volumes and/or pressures of specific portions of the airbag 18, 18' as described below, may address these changes in the overall stiffness. The increase in stiffness to the front end provided by the airbag 18 is represented as open rectangles in FIG. 2 between the frame rails 12. That is, the volumes and/or pressures of specific portions of the airbag 18, 18' can result in an overall stiffness of the front end 84 of the vehicle 10, 10' being substantially similar in the cross-vehicle direction A, shown as the combined shaded and open rectangles forming a single uniform rectangle in the cross-vehicle direction A between the frame rails 12. The portions of the front end 84 outboard of the frame rails 12 may have fewer components and other structure to provide stiffness, so the stiffness of those portions may be lower than portions of the front end 84 near the frame rails 12.

The airbag 18, 18' may include a plurality of chambers, i.e., portions of the airbag 18, 18' that expand when provided with inflation medium. FIGS. 1-5 show the airbag 18, 18' with six chambers 20, 20', 22, 22', 24, 24', 32, 32', 34, 34', 36, 36' i.e., the first airbag chamber 20, 20', the second airbag chamber 22, 22', a third airbag chamber 24, 24', a fourth airbag chamber 32, 32', a fifth airbag chamber 34, 34', and a sixth airbag chamber 36, 36'. Alternatively, the airbag 18, 18' may have any suitable number of chambers. The chambers 20, 20', 22, 22', 24, 24', 32, 32', 34, 34', 36, 36' can each be selectively inflated from a respective uninflated position to a respective inflated position to absorb energy from the impact. That is, when each chamber 20, 20', 22, 22', 24, 24', 32, 32', 34, 34', 36, 36' is in the respective inflated position, the inflation medium in the chamber 20, 20', 22, 22', 24, 24', 32, 32', 34, 34', 36, 36' absorbs energy from the impact. Each chamber 20, 20', 22, 22', 24, 24', 32, 32', 34, 34', 36, 36' in the respective inflated position may increase the stiffness of the front end of the vehicle 10, 10' and thus specifying the volumes and/or pressures of the chambers 20, 20', 22, 22', 24, 24', 32, 32', 34, 34', 36, 36' may reduce the variations in the stiffness in the front end of the vehicle 10, 10'.

The airbag 18, 18' includes the first airbag chamber 20, 20' as shown in FIGS. 1-5. The first airbag chamber 20, 20' is supported by the bumper beam 16. The first airbag chamber 20, 20' is inflatable to the inflated position. In the inflated position, the first airbag chamber 20, 20' has a first volume. The first airbag chamber 20, 20' has a first inflation pressure, i.e., a pressure of inflation medium in the first airbag chamber 20, 20'. The first airbag chamber 20, 20' may be inflated to the first volume and the first inflation pressure to address variations in the stiffness of the front end 84 of the vehicle 10, 10' near the midpoint 30 of the bumper beam 16 as described above. For example, a larger volume of the first airbag chamber 20, 20' can increase the stiffness of the location at which the first airbag chamber 20, 20' is supported. In another example, a higher inflation pressure of the first airbag chamber 20, 20' can increase the stiffness of the location at which the first airbag chamber 20, 20' is supported.

The airbag 18, 18' includes the second airbag chamber 22, 22' as shown in FIGS. 1-5. The second airbag chamber 22, 22' is supported by the bumper beam 16. The second airbag chamber 22, 22' is inflatable to an inflated position. The second airbag chamber 22, 22' is disposed in the cross-vehicle direction A relative to the first airbag chamber 20, 20'. In the inflated position, the second airbag chamber 22, 22' has a second volume. The second volume of the second airbag chamber 22, 22' is different than the first volume of the first airbag chamber 20, 20'. The second airbag chamber 22, 22' has a second inflation pressure. The second inflation pressure may be different than the first inflation pressure. Because the stiffness of the front end 84 of the vehicle 10 may differ in the cross-vehicle direction A, the second volume and/or the second inflation pressure may differ from the first volume and/or the first inflation pressure to address the differences. For example, the second airbag chamber 22, 22' may be near one of the frame rails 12, and the second volume may be less than the first volume because the stiffness of the front end 84 of the vehicle 10, 10' near the frame rails 12 is greater than the stiffness of the front end 84 of the vehicle 10 near the midpoint 30 where the first airbag chamber 20, 20' is supported.

The second airbag chamber 22, 22' may be aligned with one of the frame rails 12 in the cross-vehicle direction A, as shown in FIGS. 1-5. That is, the second airbag chamber 22, 22' may be disposed on the bumper beam 16 to absorb energy during the impact that would be absorbed by the frame rail 12. The fifth airbag chamber 34, 34' may be aligned with the other of the frame rails 12. As shown in FIGS. 1-5, by aligning the second airbag chamber 22, 22' with one of the frame rails 12 and the fifth airbag chamber 34, 34' with the other of the frame rails 12, the airbag 18, 18' can address variations in the stiffness of the front end 84 caused by the frame rails 12. That is, as described above, the frame rails 12 may increase the stiffness of the front end 84, reducing deformation of the front end 84 near the frame rails 12, and the second airbag chamber 22, 22' and the fifth airbag chamber 34, 34' may be inflated to respective specified volumes based on the reduced deformation. By inflating the second and fifth airbag chambers 22, 22', 34, 34' to different respective volumes and/or pressures than the other airbag chambers 20, 20', 24, 24', 32, 32', 36, 36' the airbag 18 can reduce variations in the stiffness of the front end 84 of the vehicle 10 caused by the increase to the stiffness from the frame rails 12.

Figure 3:
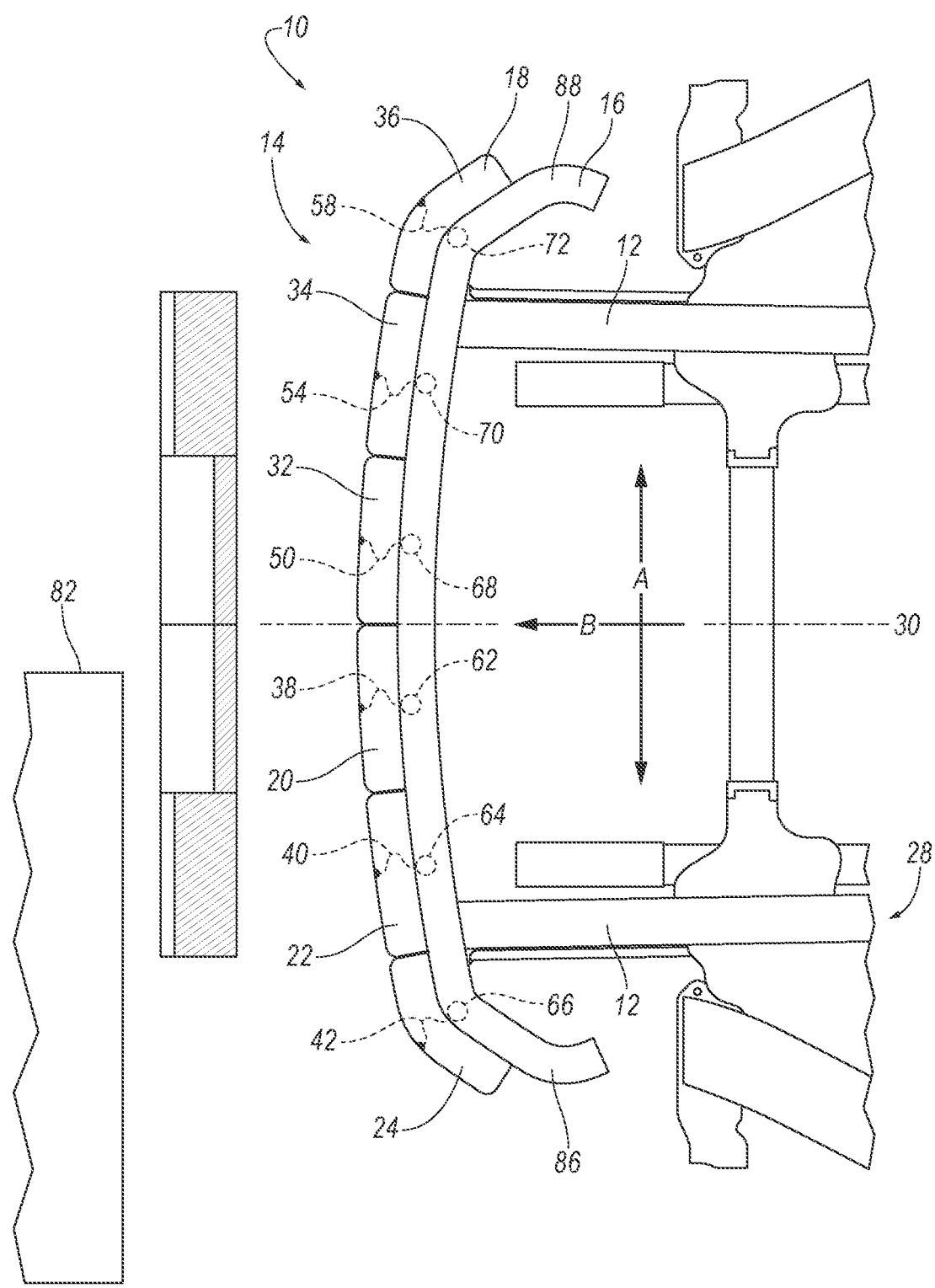
FIG. 3 is a top-down view of the vehicle approaching a barrier.
Figure 4A:
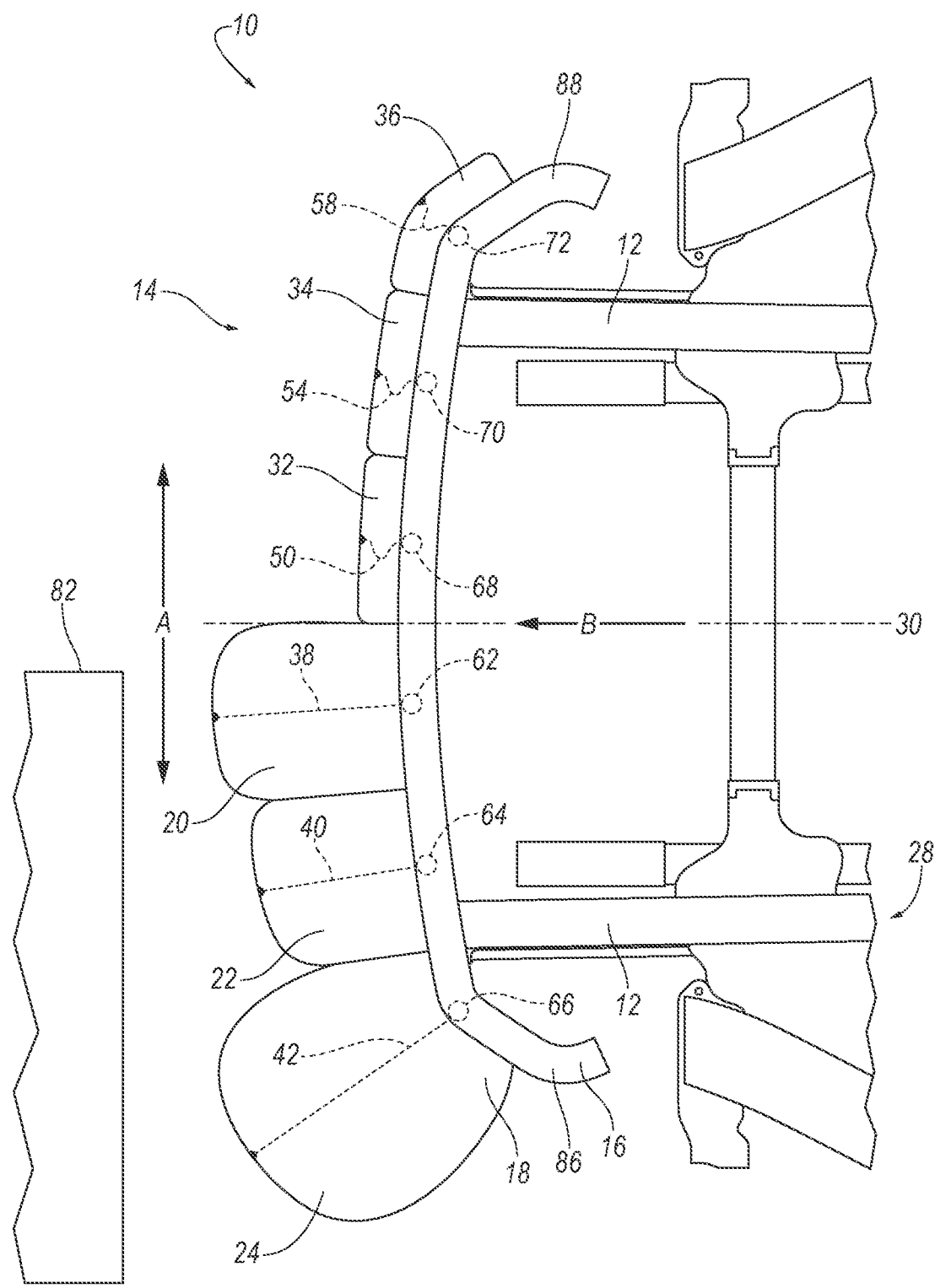
FIG. 4A is a top-down view of the vehicle with chambers of the airbag in the inflated position approaching the barrier.
Figure 4B:
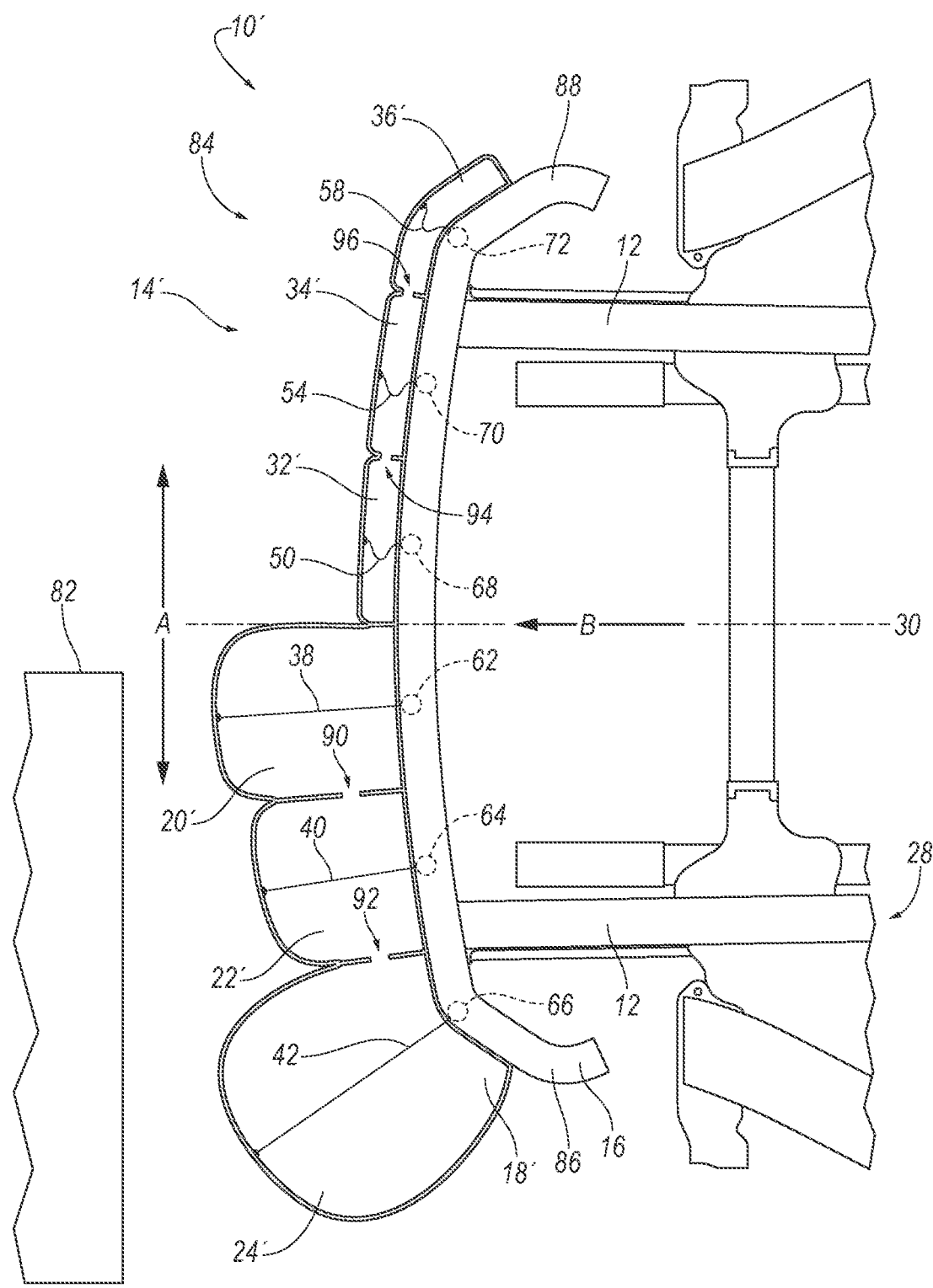
FIG. 4B is a top-down view of another vehicle with chambers of another airbag in the inflated position approaching the barrier.
Figure 5:
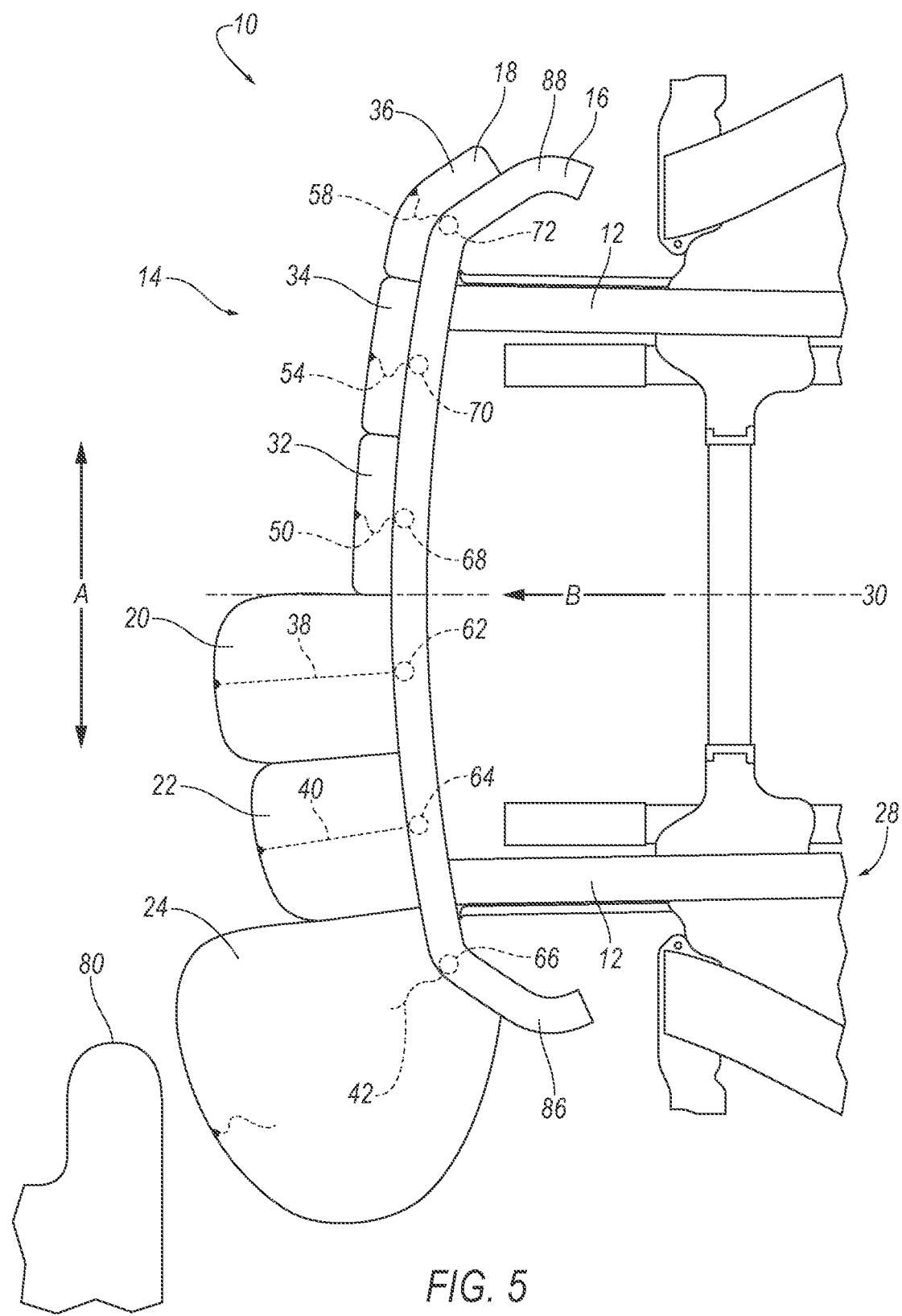
FIG. 5 is a top-down view of the vehicle approaching an offset barrier.

The airbag 18 may include the third airbag chamber 24, 24' as shown in FIGS. 1-5. The third airbag chamber 24, 24' may be supported by the bumper beam 16. The third airbag chamber 24, 24' is inflatable to an inflated position. The third airbag chamber 24, 24' may be disposed in the cross-vehicle direction A relative to the first airbag chamber 20, 20' and the second airbag chamber 22, 22'. That is, the third airbag chamber 24, 24' may be disposed outboard of the frame rail 12 where the stiffness of the front end 84 is lower than the stiffness of the front end 84 between the frame rails 12. In the inflated position, the third airbag chamber 24, 24' has a third volume. The third volume of the third airbag chamber 24, 24' may be different than the first volume of the first airbag chamber 20, 20' and the second volume of the second airbag chamber 22, 22'. For example, the third volume may be greater than the first volume or the second volume, as shown in FIGS. 4A-5, to increase the stiffness of the front end 84 outboard of the frame rail 12.

The first, second, and third airbag chambers 20, 20', 22, 22', 24, 24' may be arranged on the bumper beam 16 to absorb impacts on a left side of the bumper beam 16. That is, the first, second, and third airbag chambers 20, 20', 22, 22', 24, 24' may be disposed in an outboard direction relative to the midpoint 30 of the bumper beam 16. The second airbag chamber 22, 22' may be outboard of the first airbag chamber 20, 20', as shown in FIGS. 1-5. The third airbag chamber 24, 24' may be outboard of the second airbag chamber 22, 22'. The third airbag chamber 24, 24' may be outboard of one of the frame rails 12. The first airbag chamber 20, 20' may be disposed between the midpoint 30 of the bumper beam 16 and the second airbag chamber 22, 22'.

The airbag 18, 18' may include the fourth airbag chamber 32, 32', the fifth airbag chamber 34, 34', and the sixth airbag chamber 36, 36', as shown in FIGS. 1-5. The fourth, fifth, and sixth airbag chambers 32, 32', 34, 34', 36, 36' may be disposed on an opposite side of the bumper beam 16 than the first, second, and third airbag chambers 20, 20', 22, 22', 24, 24'. The midpoint 30 of the bumper beam 16 may be disposed between the first airbag chamber 20, 20' and the fourth airbag chamber 32, 32'. The fourth airbag chamber 32, 32', the fifth airbag chamber 34, 34', and the sixth airbag chamber 36, 36' may be supported by the bumper beam 16 in a reversed orientation to the first airbag chamber 20, 20', the second airbag chamber 22, 22', and the third airbag chamber 24, 24'. That is, the fifth airbag chamber 34, 34' may be disposed outboard relative to the fourth airbag chamber 32, 32' and the sixth airbag chamber 36, 36' may be disposed outboard relative to the fifth airbag chamber 34, 34'. That is, the first, second, and third airbag chambers 20, 20', 22, 22', 24, 24' may be disposed on a left side of the bumper beam 16 relative to the vehicle-forward direction B and the fourth, fifth, and sixth airbag chamber 32, 32', 34, 34', 36, 36' may be disposed on a right side of the bumper beam 16 relative to the vehicle-forward direction B. Thus, the airbag chambers 20, 20', 22, 22', 24, 24', 32, 32', 34, 34', 36, 36' may extend in the cross-vehicle direction A along the entire bumper beam 16, reducing variations in the stiffness of the front end 84 of the vehicle 10 in the cross-vehicle direction A.

Figure 6:
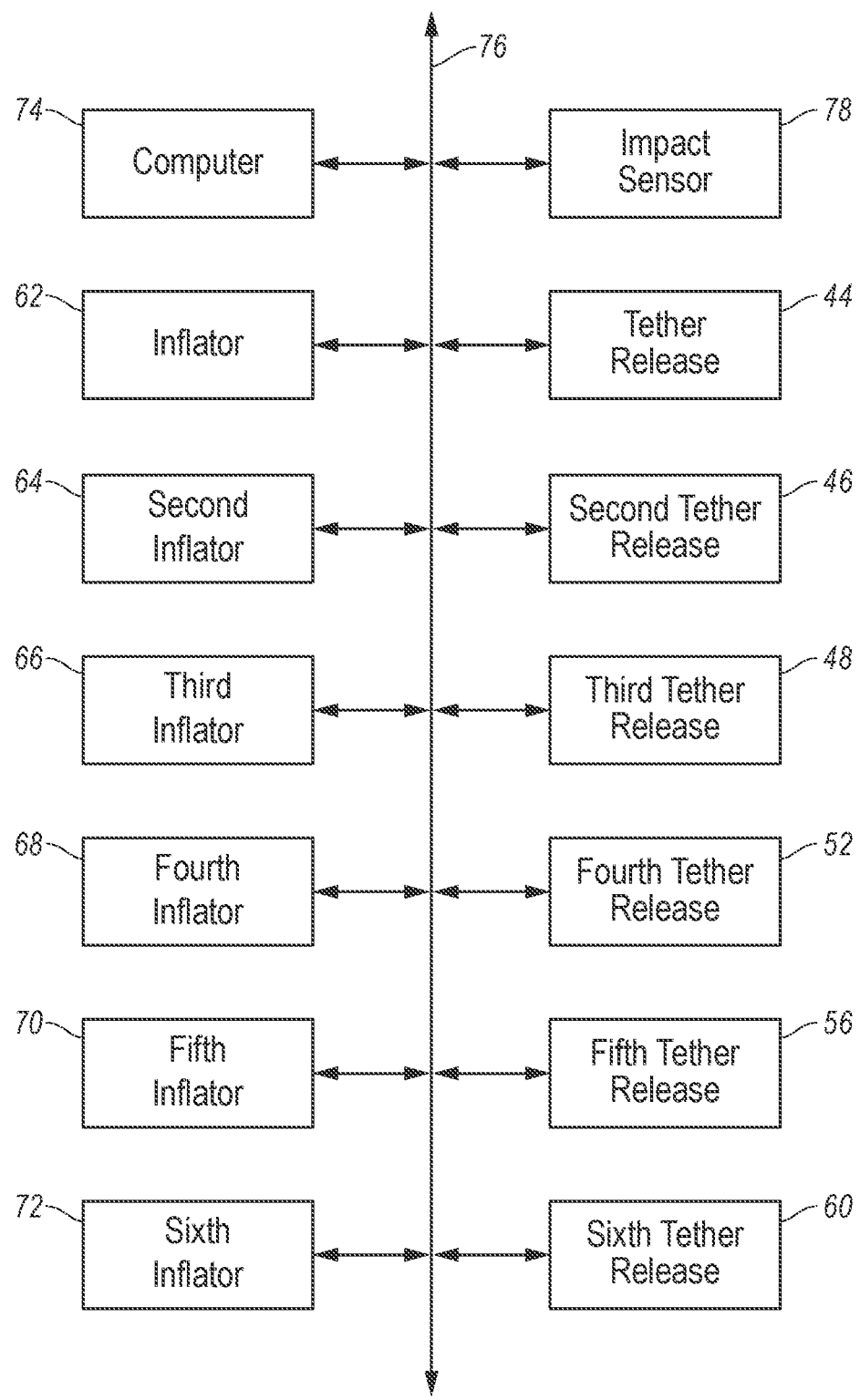
FIG. 6 is a diagram of a computer of the vehicle.

To control respective volumes of the chambers 20, 20', 22, 22', 24, 24', 32, 32', 34, 34', 36, 36', the airbag 18, 18' may include one or more tethers 38, 40, 42, 50, 54, 58, as shown in FIGS. 3-5. The tethers 38, 40, 42, 50, 54, 58 may restrict expansion of the airbag 18 to a specified volume when the airbag 18 inflates to the inflated position. The tethers 38, 40, 42, 50, 54, 58 may each extend from one portion of the airbag 18 to another portion of the airbag 18. As each chamber 20, 20', 22, 22', 24, 24', 32, 32', 34, 34', 36, 36' inflates, the respective tether 38, 40, 42, 50, 54, 58 may restrict the respective chamber 20, 20', 22, 22', 24, 24', 32, 32', 34, 34', 36, 36' to a specified volume, providing a specified increase in stiffness of the front end 84 of the vehicle 10. That is, specifying the volume of the airbag 18, 18' with the tethers 38, 40, 42, 50, 54, 58 may provide increases in the stiffness of the front end 84 of the vehicle 10 for specific types of vehicle impacts. The airbag 18, 18' may include six tethers 38, 40, 42, 50, 54, 58, as shown in FIGS. 3-5, i.e., a tether 38, a second tether 40, a third tether 42, a fourth tether 50, a fifth tether 54, and a sixth tether 58. Alternatively, the airbag 18, 18' may include any suitable number of tethers 38, 40, 42, 50, 54, 58. The airbag 18 may include respective tether releases 44, 46, 48, 52, 56, 60 for each tether 38, 40, 42, 50, 54, 58, as shown in FIG. 6. Each tether release 44, 46, 48, 52, 56, 60 may release its respective tether 38, 40, 42, 50, 54, 58, e.g., by severing, cutting, etc. Upon releasing the tether 38, 40, 42, 50, 54, 58, the airbag 18 may inflate to a greater volume than when the tether 38, 40, 42, 50, 54, 58 was intact. Thus, selectively actuating the tether releases 44, 46, 48, 52, 56, 60 to release specific tethers 38, 40, 42, 50, 54, 58 allows respective volumes of specific chambers 20, 20', 22, 22', 24, 24', 32, 32', 34, 34', 36, 36' to increase, thereby increasing the stiffness of the front end 84 of the vehicle 10 to absorb energy during specific types of impacts.

The first airbag chamber 20, 20' may include the tether 38, as shown in FIGS. 3-5. The tether 38 may have a first end attached to the bumper beam 16 and a second end attached to the first airbag chamber 20, 20'. The second airbag chamber 22, 22' may include the second tether 40 having a first end attached to the bumper beam 16 and a second end attached to the second chamber 22, 22'. The third airbag chamber 24, 24' may include the third tether 42 having a first end attached to the bumper beam 16 and a second end attached to the third airbag chamber 24, 24'. The fourth airbag chamber 32, 32' may include the fourth tether 50 having a first end attached to the bumper beam 16 and a second end attached to the fourth airbag chamber 32, 32'. The fifth airbag chamber 34, 34' may include the fifth tether 54 having a first end attached to the bumper beam 16 and a second end attached to the fifth airbag chamber 34, 34'. The sixth airbag chamber 36, 36' may include the sixth tether 58 having a first end attached to the bumper beam 16 and a second end attached to the sixth airbag chamber 36, 36'.

To inflate the airbag 18, 18', the vehicle 10 may include one or more inflators 62, 64, 66, 68, 70, 72, as shown in FIGS. 3-6. The inflators 62, 64, 66, 68, 70, 72 provide inflation medium to the airbag 18. The inflators 62, 64, 66, 68, 70, 72 are in fluid communication with the airbag 18. The inflators 62, 64, 66, 68, 70, 72 expand the airbag 18, 18' with inflation medium, such as a gas, to move the airbag 18 from the uninflated position to the inflated position. The inflators 62, 64, 66, 68, 70, 72 may be supported by any suitable component. For example, the inflators 62, 64, 66, 68, 70, 72 may be supported by the housing. The inflators 62, 64, 66, 68, 70, 72 may be, for example, a pyrotechnic inflators 62, 64, 66, 68, 70, 72 that ignite a chemical reaction to generate the inflation medium, stored gas inflators 62, 64, 66, 68, 70, 72 that release (e.g., by a pyrotechnic valve) stored gas as the inflation medium, or a hybrid. The inflators 62, 64, 66, 68, 70, 72 may be, for example, at least partially in the inflation chamber to deliver inflation medium directly to the inflation chamber or may be connected to the inflation chamber through fill tubes, diffusers, etc.

The vehicle 10 may include six inflators, i.e., a first inflator 62, a second inflator 64, a third inflator 66, a fourth inflator 68, a fifth inflator 70, and a sixth inflator 72, as shown in FIGS. 3-5. Alternatively, the vehicle 10 may include any suitable number of inflators 62, 64, 66, 68, 70, 72. Each chamber 20, 20', 22, 22', 24, 24', 32, 32', 34, 34', 36, 36' may include a respective inflator 62, 64, 66, 68, 70, 72. The first inflator 62 may be supported by the bumper beam 16 and may inflate the first chamber 20, 20' to the inflated position. The second inflator 64 may be supported by the bumper beam 16 and may inflate the second airbag chamber 22, 22' to the inflated position. The third inflator 66 may be supported by the bumper beam 16 and may inflate the third airbag chamber 24, 24' to the inflated position. The fourth inflator 68 may be supported by the bumper beam 16 and may inflate the fourth airbag chamber 32, 32' to an inflated position. The fifth inflator 70 may be supported by the bumper beam 16 may inflate the fifth airbag chamber 34, 34' to an inflated position. The sixth inflator 72 may be supported by the bumper beam 16 may inflate the sixth airbag chamber 36, 36' to an inflated position.

Each of the chambers 20, 22, 24, 32, 34, 36 may be fluidly isolated from each other, as shown in FIG. 4A. That is, each inflator 62, 64, 66, 68, 70, 72 may inflate only one of the chambers 20, 22, 24, 32, 34, 36. When the chambers 20, 22, 24, 32, 34, 36 are fluidly isolated, each inflator 62, 64, 66, 68, 70, 72 may inflate each chamber 20, 22, 24, 32, 34, 36 to a specified volume and/or pressure without inflation medium from another inflator each inflator 62, 64, 66, 68, 70, 72. Thus, each chamber 20, 22, 24, 32, 34, 36 may be individually inflated to a specified volume and/or pressure to reduce variations in the stiffness of the front end 84 of the vehicle 10.

Alternatively, one or more of the chambers 20', 22', 24', 32', 34', 36' may be in fluid communication with one or more of the other chambers 20', 22', 24', 32', 34', 36', as shown in FIG. 4B. When the chambers 20', 22', 24', 32', 34', 36' are in fluid communication with each other, the airbag 18' may be inflated with less than all of the inflators 62, 64, 66, 68, 70, 72. Thus, a single inflator 62 may inflate multiple chambers 20', 22', 24', 32', 34', 36' as the inflation medium communicates between the chambers 20', 22', 24', 32', 34', 36'. Thus, the chambers 20', 22', 24', 32', 34', 36' may be gradually inflated such that the volumes of the chambers 20', 22', 24', 32', 34', 36' may differ during inflation to reduce variations in the stiffness of the front end 84 of the vehicle 10. FIG. 4B illustrates the chambers 20', 22', 24' in fluid communication and the chambers 32', 34', 36' in fluid communication, and the airbag 18, 18' may include any suitable arrangement of fluidly isolated chambers 20, 22, 24, 32, 34, 36 and fluidly connected chambers 20', 22', 24', 32', 34', 36'.

The chambers 20', 22', 24', 32', 34', 36' may include one or more vents of passages for flow of inflation medium between the chambers 20', 22', 24', 32', 34', 36'. For example, the first airbag chamber 20' and the second airbag chamber 22' may be in fluid communication via a vent 90, and the inflator 62 may provide inflation medium to the first airbag chamber 20' that moves through the vent 90 to the second airbag chamber 22'. FIG. 4B shows the second inflator 64 in communication with the second airbag chamber 22', and the second inflator 64 may be omitted when the inflator 62 inflates both the first airbag chamber 20' and the second airbag chamber 22'. In another example, the third airbag chamber 24' may be in fluid communication with the second airbag chamber 22' via a vent 92, and the inflator 62 may inflate the first airbag chamber 20', the second airbag chamber 22', and the third airbag chamber 24'. That is, the inflator 62 may gradually inflate the first airbag chamber 20', then the second airbag chamber 22', and then the third airbag chamber 24' as the inflation medium moves from the first airbag chamber 20' to the second airbag chamber 22' and then to the third airbag chamber 24'. The fourth, fifth, and sixth chamber 32', 34', 36' may be in fluid communication in a mirrored orientation to the first, second, and third airbag chambers 20', 22', 24'. That is, the fourth chamber 32' may be in fluid communication with the fifth chamber 34' via a vent 94, and the fifth chamber 34' may be in fluid communication with the sixth chamber 36' via a vent 96. The fourth inflator 68 may provide inflation medium to the fourth chamber 32' that moves through the vent 94 into the fifth airbag chamber 34' and through the vent 96 into the sixth airbag chamber 36'.

The vehicle 10 may include a computer 74, as shown in FIG. 6. The computer 74 includes a processor and a memory such as are known. The memory includes one or more forms of computer-readable media, and stores instructions executable by the processor for performing various operations, including as disclosed herein. The computer 74 may include or be communicatively coupled to, e.g., via a network such as a communications bus 76 as described further below, more than one processor, e.g., included in components such as sensors, electronic controller units (ECUs) or the like included in the vehicle 10 for monitoring and/or controlling various vehicle 10 components, e.g., a powertrain controller, a brake controller, a steering controller, etc. The computer 74 is generally arranged for communications on a vehicle communication network that may include the bus 76 in the vehicle 10 such as a controller area network (CAN) or the like, and/or other wired and/or wireless mechanisms. Via the vehicle network, the computer 74 may transmit messages to various devices in the vehicle 10 and/or receive messages (e.g., CAN messages) from the various devices, e.g., sensors, an actuator, a human machine interface (HMI), etc. Alternatively or additionally, in cases where the computer 74 actually comprises a plurality of devices, the vehicle communication network may be used for communications between devices represented as the computer 74 in this disclosure. Further, as mentioned below, various controllers and/or sensors may provide data to the computer 74 via the vehicle communication network.

The vehicle 10 may include at least one impact sensor 78 for sensing impact of the vehicle 10, and a computer 74 in communication with the impact sensor 78 and the inflators 62, 64, 66, 68, 70, 72. The computer 74 may activate the inflators 62, 64, 66, 68, 70, 72, e.g., provide an impulse to a pyrotechnic charge of the inflators 62, 64, 66, 68, 70, 72 when the impact sensor 78 senses an impact of the vehicle 10. Alternatively or additionally to sensing impact, the impact sensor 78 may be configured to sense impact prior to impact, i.e., pre-impact sensing. The impact sensor 78 may be in communication with the computer 74. The impact sensor 78 is configured to detect an impact to the vehicle 10. The impact sensor 78 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 78 may be located at numerous points in or on the vehicle 10.

The computer 74 may detect a plurality of types of impacts. A "type" of impact is a classification of an impact that is based on one or more characteristics of the impact. The impacts may be defined by an impact test. One impact test proposed by the European New Car Assessment Program (EURO NCAP) is a moving progressive deformable barrier (MPDB) test. The MPDB impact is an impact between a deformable barrier 82 and a front end of the vehicle 10. The MPDB impact may impact less than the entire front end of the vehicle 10. For example, during a EURO NCAP test, the MPDB impact may overlap 50% of the front end of the vehicle 10 including the portion of the bumper beam 16 that supports the first airbag chamber 20, 20' the second airbag chamber 22, 22' and the third airbag chamber 24, 24'. During the MPDB test, the vehicle 10 moves at a specified speed (e.g., 50 kilometers per hour (kph)) and a barrier, such as a barrier 82 shown in FIGS. 3-4, moves at the same specified speed toward the vehicle 10. The barrier overlaps a portion of the vehicle 10, i.e., not all of the bumper beam 16 is impacted by the barrier. An impact with the barrier that overlaps only a portion of the vehicle 10 is an "offset" impact. Upon detecting the MPDB impact, the computer 74 may selectively inflate some, but not all, of the airbag chambers 20, 20', 22, 22', 24, 24', 32, 32', 34, 34', 36, 36'. For example, as shown in FIGS. 2, 4A-4B, the computer 74 can inflate the first airbag chamber 20, 20', the second airbag chamber 22, 22', and the third airbag chamber 24, 24'.

Another type of impact is an impact with a small offset rigid barrier 80 (SORB), i.e., a "SORB impact," as shown in FIG. 5. The SORB impact may be offset further laterally than the MPDB impact. That is, the SORB 80 may be disposed outboard of the frame rails 12. The computer 74 may inflate the third airbag chamber 24, 24' in response to detection of impact with the small offset rigid barrier 80. That is, the oblique impact may only contact the portion of the front end 84 outboard of the frame rail 12, where the stiffness is lowest relative to other portions of the front end 84, and the computer 74 may selectively inflate the third airbag chamber 24, 24' to absorb energy from the SORB 80.

The computer 74 may be programmed to selectively release one or more of the tethers 38, 40, 42, 50, 54, 58 based on the type of impact. Releasing tethers 38, 40, 42, 50, 54, 58 increases the volumes of the chambers 20, 20', 22, 22', 24, 24', 32, 32', 34, 34', 36, 36', providing specific increases in the stiffness of the front end 84 to absorb energy at the location of the front end 84 where vehicle impact occurs. For example, the computer 74 may be programmed to release the third tether 38 in response to detection of impact with a small offset rigid barrier 80 as shown in FIG. 5. The computer 74 may actuate the third tether release 48 to release the third tether 42 upon detecting the SORB impact, increasing the third volume and absorbing more energy from the small offset rigid barrier 80 than the third airbag chamber 24, 24' may absorb when the third tether 42 is intact. Alternatively or additionally, the computer 74 may be programmed to release the tether 38 and the second tether 40 upon detection of the MPDB impact.

The vehicle 10 may communicate with each inflator 62, 64, 66, 68, 70, 72 and each tether release 44, 46, 48, 52, 56, 60 via the bus 76. The vehicle 10 can, based on a type of impact detected by the impact sensor, selectively actuate one or more of the inflators 62, 64, 66, 68, 70, 72 and one or more tether releases 44, 46, 48, 52, 56, 60 to inflate one or more of the airbag chambers 20, 20', 22, 22', 24, 24', 32, 32', 34, 34', 36, 36' to absorb energy during the impact. That is, the computer 74 can selectively control the size of each chamber 20, 20', 22, 22', 24, 24', 32, 32', 34, 34', 36, 36' based on the specific energy absorbing characteristics for each type impact. For example, the computer 74 may be programmed to refer to a look-up table or the like stored in the memory of the computer 74, such as Table 1 below, specifying specific airbag chambers 20, 20', 22, 22', 24, 24', 32, 32', 34, 34', 36, 36' to inflate based on the type of impact:

TABLE 1

| Airbag Inflation For Impact Types | | | |
|---|---|---|---|
| Type of Impact | Chambers Inflated | Inflators Actuated | Tethers Released |
| Left-Side MPDB | First, Second, Third | First, Second, Third | None |
| Right-Side MPDB | Fourth, Fifth, Sixth | Fourth, Fifth, Sixth | None |
| Left-Side SORB | First, Second, Third | First, Second, Third | Third |
| Right-Side SORB | Fourth, Fifth, Sixth | Fourth, Fifth, Sixth | Sixth |

As shown in Table 1, for an MPDB impact, the computer 74 may actuate no tether releases 44, 46, 48, 52, 56, 60 and actuate only the chambers 20, 20', 22, 22', 24, 24', 32, 32', 34, 34', 36, 36' of the airbag 18 that are on the side of the bumper beam 16 receiving the impact. Because no tethers 38, 40, 42, 50, 54, 58 are released, for a left-side MPDB impact, the volume of the first airbag chamber 20, 20' may be greater than the volume of the second airbag chamber 22, 22', and the volume of the third airbag chamber 24 may be greater than the volumes of the first and second airbag chambers 20', 22', as shown in FIGS. 2 and 4. Thus, the specific volumes of the airbag chambers 20, 20', 22, 22', 24, 24' may reduce variations in stiffness across the front end of the vehicle 10 during the left-side MPDB impact to absorb energy from the barrier 82.

In another example, for a SORB impact, the computer 74 may actuate one or more of the tether releases 44, 46, 48, 52, 56, 60 to release one or more of the tethers 38, 40, 42, 50, 54, 58, increasing the volume of one or more of the chambers 20, 22, 24, 32, 34, 36 to absorb energy from the SORB 80. For example, for a left-side SORB impact, the front end 84 of the vehicle 10 receives most of the impact at the location of the bumper beam 16 outboard of the frame rail 12 where the third airbag chamber 24, 24' is supported. To increase the volume of the third airbag chamber 24, 24' to absorb the additional energy from the left-side SORB impact, the computer 74 may actuate the third tether release 48 to release the third tether 44. The third inflator 66 may then provide inflation medium to increase the volume of the third chamber 24, 24', as shown in FIG. 5. The increased volume of the third chamber 24, 24' increases the stiffness of the third chamber 24, 24', absorbing more energy from the SORB 80 than the third chamber 24, 24' would absorb if the third tether 44 were intact. Thus, the computer 74 may selectively actuate the tether releases 44, 46, 48, 52, 56, 60 to increase the respective volumes of the chambers 20, 22, 24, 32, 34, 36 to absorb energy based on the specific type of impact detected.

Figure 7:
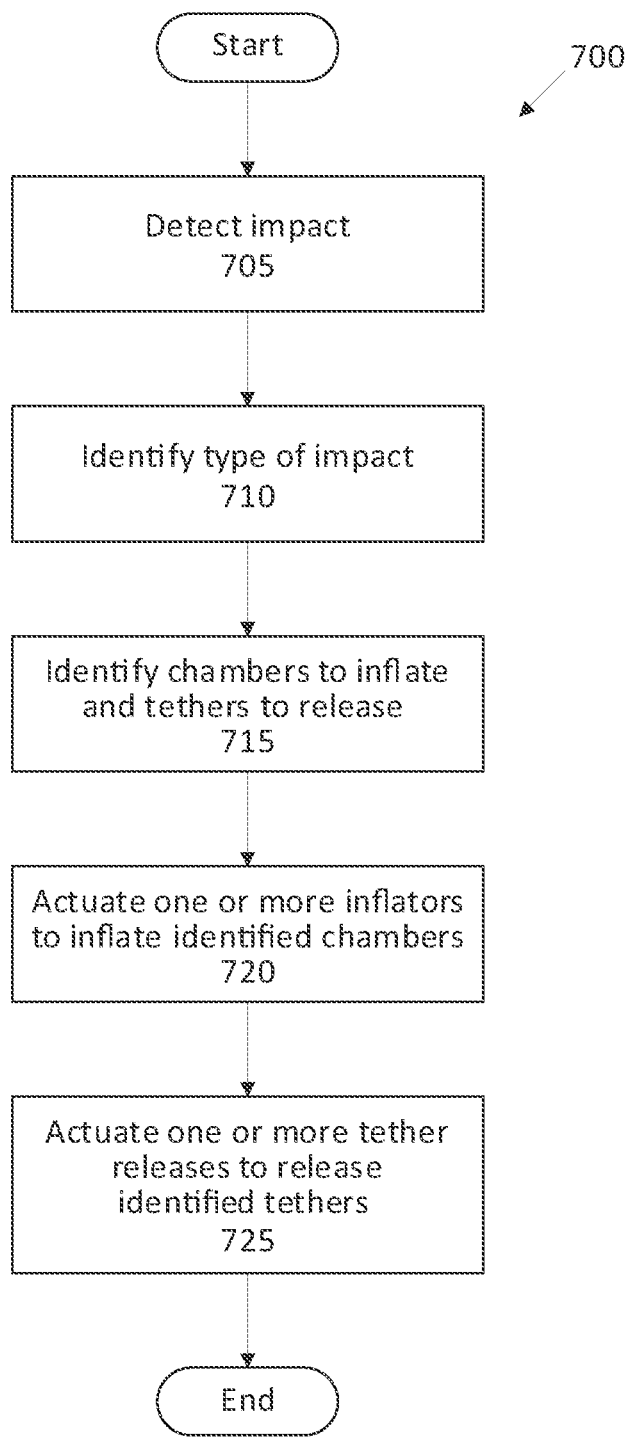
FIG. 7 is a diagram of a process for inflating the airbag in response to detecting an impact.

FIG. 7 is a block diagram of an example process 700 for inflating an airbag 18 during an impact test. The process 700 begins in a block 705, in which the computer 74 detects an impact. The computer 74 can receive data from the impact sensor 78 and, based on the data, the computer 74 can determine that the impact is occurring. For example, the computer 74 can receive acceleration data from the impact sensor 78, and when the acceleration data show an acceleration above a threshold, the computer 74 can determine that the impact is occurring. The threshold can be determined based on empirical data from impact tests, e.g., the MPDB impact test described above, the SORB impact test described above, etc.

Next, in a block 710, the computer 74 detects a type of the impact. The data from the impact sensor 78 can include a direction of the impact relative to the vehicle 10 and portions of the bumper assembly 14 that are receiving the impact. Based on the direction of the impact and the portions of the bumper assembly 14 receiving the impact, the computer 74 can determine the type of impact. For example, if the data from the impact sensor 78 indicate that the impact overlaps 50% of the bumper assembly 14 on a left side relative to a vehicle-forward direction, the computer 74 may detect the type of the impact as a left-side MPDB impact, as described above. In another example, if the data from the impact sensor 78 indicate that the vehicle 10 is impacting a small offset rigid barrier 80 outboard of the frame rails 12 and the third chamber 24, the computer 74 may detect the type of the impact as a left-side SORB impact.

Next, in a block 715, the computer 74 identifies one or more chambers 20, 20', 22, 22', 24, 24', 32, 32', 34, 34', 36, 36' of the airbag 18 to inflate and one or more tethers 38, 40, 42, 50, 54, 58 of the airbag 18 to release. As described above and shown in Table 1, the computer 74 may include a look-up table or the like specifying the chambers 20, 20', 22, 22', 24, 24', 32, 32', 34, 34', 36, 36' to inflate and the tethers 38, 40, 42, 50, 54, 58 to release to increase the stiffness of the front end of the vehicle 10 for each type of impact. For example, for the left-side MPDB impact, the computer 74 may determine to inflate the first, second, and third airbag chambers 20, 20', 22, 22', 24, 24' and to release no tethers 38, 40, 42, 50, 54, 58. In another example, for the left-side SORB impact, the computer 74 may determine to inflate the first, second, and third airbag chambers 20, 20', 22, 22', 24, 24' and to release the third tether 42.

Next, in a block 720, the computer 74 actuates one or more inflators 62, 64, 66, 68, 70, 72 to inflate the identified chambers 20, 20', 22, 22', 24, 24', 32, 32', 34, 34', 36, 36'. The computer 74 can provide an instruction over the communications bus 76 to each inflator 62, 64, 66, 68, 70, 72 that is arranged to inflate each identified chamber 20, 20', 22, 22', 24, 24', 32, 32', 34, 34', 36, 36'. For example, for the left-side MPDB impact where the airbag chambers 20, 22, 24 are fluidly isolated, the computer 74 can provide instructions to the inflator 62 to inflate the first airbag chamber 20, to the second inflator 64 to inflate the second airbag chamber 22, and to the third inflator 66 to inflate the third airbag chamber 24. In another example, for the left-side MPDB impact where the airbag chambers 20', 22', 24' are fluidly connected, the computer 74 can instruct the inflator 62 to inflate all three chambers 20', 22', 24'.

Next, in a block 725, the computer 74 actuates one or more tether releases 44, 46, 48, 52, 56, 60 to release the identified tethers 38, 40, 42, 50, 54, 58. The computer 74 can provide an instruction over the communications bus 76 to each tether release 44, 46, 48, 52, 56, 60 that is arranged to release each identified tether 38, 40, 42, 50, 54, 58. For example, for the left-side SORB impact, the computer 74 can provide an instruction to the third tether release 48 to release the third tether 44. Following the block 725, the process 700 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
a pair of frame rails;
a bumper beam supported by the frame rails;
a first airbag chamber supported by the bumper beam and inflatable to an inflated position; and
a second airbag chamber supported by the bumper beam and inflatable to an inflated position;
the first airbag chamber being disposed in a cross-vehicle direction relative to the second airbag chamber;
wherein the first airbag chamber has a first volume in the inflated position and the second airbag chamber has a second volume in the inflated position, the first volume being different than the second volume;
at least one of the first airbag chamber or the second airbag chamber including a tether; and
a computer having a processor and memory storing instructions executable by the processor to selectively release the tether based on a type of vehicle impact.

2. The vehicle of claim 1, further comprising a third airbag chamber supported by the bumper beam and inflatable to an inflated position, the third airbag chamber being disposed in a cross-vehicle direction relative to the first airbag chamber and the second airbag chamber, the third airbag chamber having a third volume in the inflated position, the third volume being different than the first volume.

3. The vehicle of claim 2, wherein the third volume is different than the second volume.

4. The vehicle of claim 2, wherein the second airbag chamber is outboard of the first airbag chamber and the third airbag chamber is outboard of the second airbag chamber, the second volume being less than the first volume and the third volume.

5. The vehicle of claim 4, wherein the third airbag chamber is outboard of one of the frame rails and the third volume is greater than the first volume.

6. The vehicle of claim 5, wherein the second airbag chamber is aligned with one of the frame rails in the cross-vehicle direction.

7. The vehicle of claim 5, wherein the third airbag chamber includes a tether, and the memory storing instructions executable by the processor to release the tether in response to detection of impact with a small offset rigid barrier.

8. The vehicle of claim 4, wherein the second airbag chamber is aligned with one of the frame rails in the cross-vehicle direction.

9. The vehicle of claim 4, wherein the memory stores instructions executable by the processor to inflate the third airbag chamber in response to detection of impact with a small offset rigid barrier.

10. The vehicle of claim 1, wherein the memory stores instructions executable by the processor to selectively inflate the first airbag chamber, the second airbag chamber, or both the first and second airbag chamber based on a type of vehicle impact detected.

11. The vehicle of claim 1, wherein the first airbag chamber and the second airbag chamber are in fluid communication with each other, and further comprising an inflator that inflates both the first airbag chamber and the second airbag chamber.

12. The vehicle of claim 1, wherein the first airbag chamber and the second airbag chamber are fluidly isolated, and further comprising a first inflator in communication with the first airbag chamber and a second inflator in communication with the second airbag chamber.

13. The vehicle of claim 12, wherein the first airbag chamber in the inflated position has a different inflation pressure than the second airbag chamber in the inflated position.

14. The vehicle of claim 1, wherein the first airbag chamber is disposed between a midpoint of the bumper beam and the second airbag chamber.

15. A bumper assembly, comprising:
a bumper beam;
a first airbag chamber supported by the bumper beam and inflatable to an inflated position; and
a second airbag chamber supported by the bumper beam and inflatable to an inflated position;
the first airbag chamber being disposed in a cross-vehicle direction relative to the second airbag chamber;
wherein the first airbag chamber has a first volume in the inflated position and the second airbag chamber has a second volume in the inflated position, the first volume being different than the second volume;
a third airbag chamber supported by the bumper beam and inflatable to an inflated position, the third airbag chamber being disposed in a cross-vehicle direction relative to the first airbag chamber and the second airbag chamber, the third airbag chamber having a third volume in the inflated position, the third volume being different than the first volume;
the second airbag chamber is outboard of the first airbag chamber and the third airbag chamber is outboard of the second airbag chamber, the second volume being less than the first volume and the third volume.

16. The bumper assembly of claim 15, wherein the third volume is different than the second volume.

17. The bumper assembly of claim 15, wherein the third volume is greater than the first volume.

* * * * *